United States Patent
Ha

(10) Patent No.: US 8,290,244 B2
(45) Date of Patent: Oct. 16, 2012

(54) APPARATUS AND METHOD FOR CONTROLLING DEPTH OF THREE-DIMENSIONAL IMAGE

(75) Inventor: Tae-hyeun Ha, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1353 days.

(21) Appl. No.: 11/492,970

(22) Filed: Jul. 26, 2006

(65) Prior Publication Data

US 2007/0047040 A1    Mar. 1, 2007

(30) Foreign Application Priority Data

Aug. 31, 2005  (KR) .......................... 10-2005-0080611

(51) Int. Cl.
*G06K 9/00*     (2006.01)
*G06T 15/00*    (2011.01)
*H04N 13/02*    (2006.01)

(52) U.S. Cl. ........................... 382/154; 345/419; 348/47

(58) Field of Classification Search .................... None
See application file for complete search history.

(56) References Cited

U.S. PATENT DOCUMENTS

| | | | | |
|---|---|---|---|---|
| 5,801,760 A | * | 9/1998 | Uomori | 348/47 |
| 6,160,909 A | * | 12/2000 | Melen | 382/154 |
| 6,798,406 B1 | * | 9/2004 | Jones et al. | 345/419 |
| 2005/0201612 A1 | * | 9/2005 | Park et al. | 382/154 |
| 2006/0203085 A1 | * | 9/2006 | Tomita | 348/51 |
| 2009/0022393 A1 | * | 1/2009 | Bar-Zohar et al. | 382/154 |

FOREIGN PATENT DOCUMENTS

| | | |
|---|---|---|
| EP | 1085769 A2 | 3/2001 |
| EP | 1328129 A1 | 7/2003 |
| JP | 2002-228976 A | 8/2002 |
| JP | 2003-107603 A | 4/2003 |
| JP | 2004-126902 A | 4/2004 |
| KR | 10-2001-0001341 A | 1/2001 |
| KR | 10-2004-0018859 A | 3/2004 |
| WO | 2004/049734 A1 | 6/2004 |

OTHER PUBLICATIONS

Communication from the Netherlands Intellectual Property Office issued Nov. 4, 2010, in counterpart application No. 1032382.

* cited by examiner

*Primary Examiner* — Matthew Bella
*Assistant Examiner* — Fred Hu
(74) *Attorney, Agent, or Firm* — Sughrue Mion, PLLC

(57) ABSTRACT

An apparatus and method for controlling the depth of a three-dimensional image. The apparatus includes: a disparity measuring unit which measures the disparity between a left eye image and a right eye image; a physical distance calculating unit which calculates the physical distance between the left eye image and the right eye image based on the measured disparity and the physical characteristics of a display; and a depth controlling unit which controls the depth depending on the calculated physical distance. It is possible to adaptively control the disparity to control the depth when a user uses a stereoscopic three-dimensional display having a different screen size than a display used in a manufacturing environment.

19 Claims, 4 Drawing Sheets

FIG. 1A  FIG. 1B  FIG. 1C
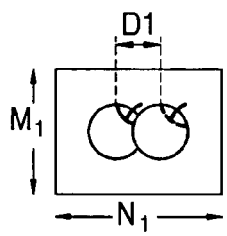 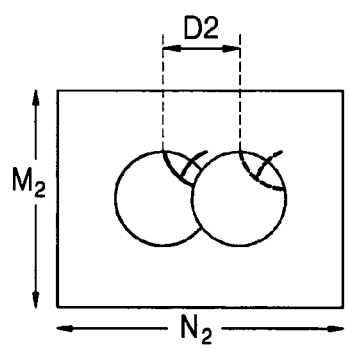 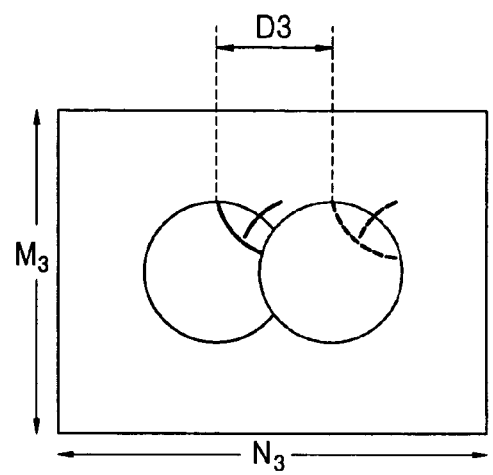
FIG. 2
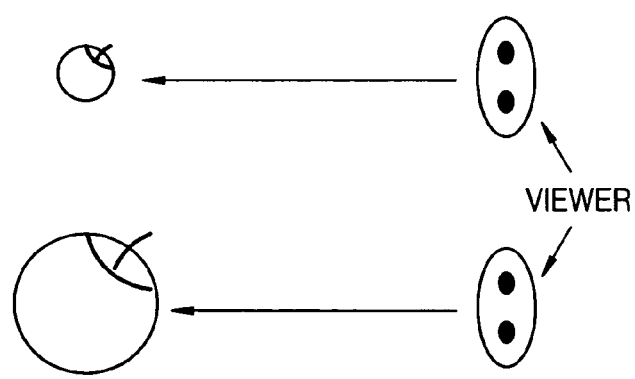

LEFT EYE IMAGE          RIGHT EYE IMAGE

APPARATUS AND METHOD FOR CONTROLLING DEPTH OF THREE-DIMENSIONAL IMAGE

CROSS-REFERENCE TO RELATED PATENT APPLICATION

This application claims the benefit of Korean Patent Application No. 10-2005-0080611, filed on Aug. 31, 2005, in the Korean Intellectual Property Office, the disclosure of which is incorporated herein in its entirety by reference.

BACKGROUND OF THE INVENTION

1. Field of the Invention

The present invention relates to an apparatus and method for controlling the depth of a three-dimensional image, and more particularly, to an apparatus and method for adaptively controlling disparity to control the image depth when a user uses a stereoscopic three-dimensional display of a different size than a display used in a manufacturing environment.

2. Description of the Related Art

Current three dimensional displays generally use a method of projecting images having different disparities to the left and right eyes of a user and applying a three-dimensional effect to the displayed image by adding a film-shaped micropolarizer, a barrier, or a lenticular lens to a two-dimensional flat display. Three-dimensional displays using this method are classified into stereoscopic three-dimensional displays and multi-view three-dimensional displays in accordance with the number of views of the display. The stereoscopic three-dimensional display displays images of two views and the multi-view three-dimensional display displays images of three or more views.

A realistic image is created using a stereoscopic camera having two incident lenses or a multi-view camera having several incident lenses, and stereo or multi-view contents are created by computer graphic technology. Here, the image or the image contents are created in consideration of human visual characteristics. However, if the characteristics such as size and resolution of the display used in the manufacturing environment are different from those of the display used by the user, the desired three-dimensional image cannot be displayed.

SUMMARY OF THE INVENTION

The present invention provides an apparatus and method for adaptively controlling disparity to control the image depth when a user uses a stereoscopic three-dimensional display having a different size than a display used in a manufacturing environment.

According to an aspect of the present invention, there is provided an apparatus for controlling the depth of a three-dimensional image, including: a disparity measuring unit which measures the disparity between a left eye image and a right eye image; a physical distance calculating unit which calculates the physical distance between the left eye image and the right eye image based on the measured disparity and the physical characteristics of a display; and a depth controlling unit which controls the depth depending on the calculated physical distance.

The disparity measuring unit may estimate the disparity between the left eye image and the right eye image and determine any one of a maximum value, a minimum value, and a mean value of the disparity as a reference value.

The physical characteristics of the display may include the physical size of one pixel in the display, and the physical distance calculating unit may read the physical size of one pixel which has been previously stored and multiply the reference value by the physical size of that pixel to calculate the physical distance of the disparity.

The depth controlling unit may control the physical distance based on a threshold value determined depending on the physical characteristics of the display.

The depth controlling unit may compare a maximum value of the calculated physical distance with a maximum threshold value of the physical distance, control the maximum value to less than the maximum threshold value if the calculated maximum value is greater than the maximum threshold value, and control the physical distance between objects in the images in proportion to the controlled maximum value.

The depth controlling unit may compare a mean value of the calculated physical distance with a mean threshold value of the physical distance, control the mean value to less than the mean threshold value if the calculated mean value is greater than the mean threshold value, and control the physical distance between objects in the images in proportion to the controlled mean value.

The depth controlling unit may compare a maximum value of the calculated physical distance with a minimum threshold value of the physical distance, control the maximum value to greater than the minimum threshold value if the calculated maximum value is less than the minimum threshold value, and control the physical distance between objects in the images in proportion to the controlled maximum value.

The depth controlling unit may reconstruct an intermediate image using an intermediate view reconstruction method based on the controlled physical distance and replace at least one of the left eye image and the right eye image with the reconstructed intermediate image to control the depth. The depth controlling unit may horizontally move the left eye image and the right eye image based on the controlled physical distance and synthesize the horizontally moved left eye image and right eye image to control the depth.

The apparatus for controlling the depth may further include a display unit which displays the image having the controlled depth, output from the depth controlling unit.

According to another aspect of the present invention, there is provided a method for controlling the depth of a three-dimensional image, including: measuring the disparity between a left eye image and a right eye image; calculating the physical distance between the left eye image and the right eye image based on the measured disparity and the physical characteristics of a display; and controlling the depth depending on the calculated physical distance.

BRIEF DESCRIPTION OF THE DRAWINGS

The above and other features and advantages of the present invention will become more apparent by describing in detail exemplary embodiments thereof with reference to the attached drawings in which:

FIGS. 1A-1C illustrate a disparity variation between a left eye image and a right eye image in accordance with the variation of the screen size of a display;

FIG. 2 illustrates the relationship between the depth and the size of an object when a user views a large object and a small object at the same position;

DETAILED DESCRIPTION OF THE INVENTION

The present invention will now be described more fully with reference to the accompanying drawings, in which exemplary embodiments of the invention are shown.

FIGS. 1A-1C a disparity variation between a left eye image and a right eye image in accordance with the variation of the screen size of a display.

When content is created for a display screen illustrated in FIG. 1B, the content has an optimal depth D2 when reproduced on the same display screen. Accordingly, if the content is intended for a three-dimensional display having a screen size of N2×M2 (inch$^2$) illustrated in FIG. 1B but a user watches the content on a display having a smaller screen size of N1×M1 (inch$^2$) illustrated in FIG. 1A, the depth of the three-dimensional image is reduced and thus the user feels as if the object on the screen is distant. That is, the three-dimensional effect deteriorates.

When the user watches the three-dimensional content on a display having a larger screen size of N3×M3 (inch$^2$), the user feels as if the object on the screen is very close, which can cause fatigue or eye strain. In some cases, the object may have a depth which cannot be perceived by a human.

FIG. 2 illustrates the relationship between the depth and the size of an object when a user views a large object and a small object at the same position.

If the distance between an object and a user who watches the object is constant, the depth does not actually vary even if the size of the object varies. However, in a three-dimensional display using stereoscopic disparity, since the disparity between a left eye image and a right eye image is proportional to the depth perceived by the user and varies depending on the screen size of the display, the same problem as described with reference to FIG. 1 occurs.

Figure 3A:
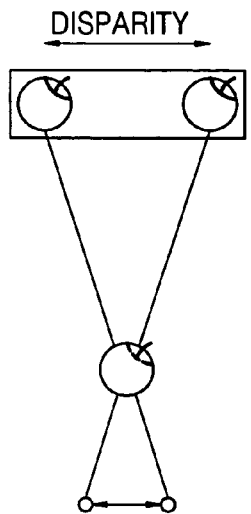
FIGS. 3A-3C illustrate the variation of the depth of an object depending on the screen size of a display and the position of a user.
Figure 3B:
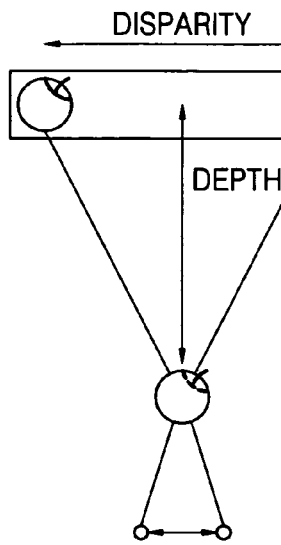
Figure 3C:
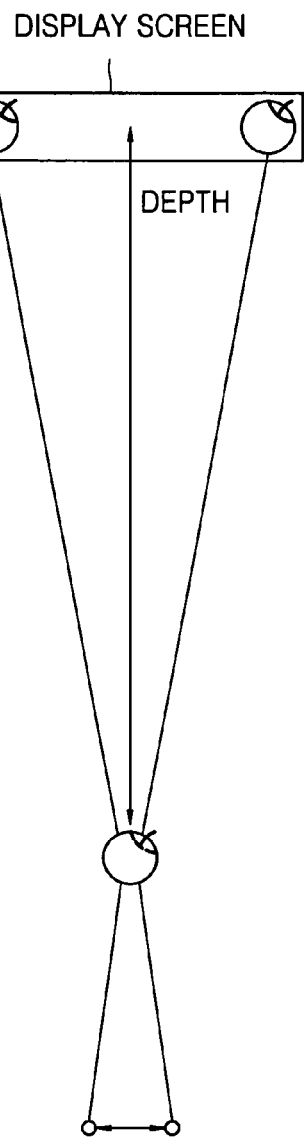

FIGS. 3A-3C the variation of the depth of an object depending on the screen size of a display and the position of a user.

As illustrated in FIGS. 3A and 3B, if the screen size increases while the position of the user is constant, the disparity increases and thus the depth increases. As illustrated in FIGS. 3B and 3C, if the distance between the display and the user doubles, the depth increases.

Accordingly, when the user watches the image content on a display having a different screen size from the display used when making the content, the depth must be controlled such that the image is suitably displayed on the user's display.

Figure 4:
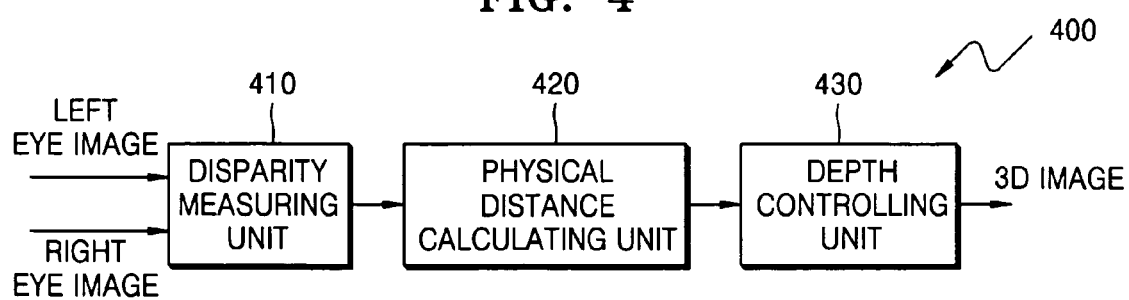
FIG. 4 illustrates the structure of an apparatus for adaptively controlling the depth of a three-dimensional image according to an embodiment of the present invention.

FIG. 4 illustrates the structure of an apparatus for adaptively controlling the depth of a three-dimensional image according to an embodiment of the present invention.

The apparatus 400 for controlling the depth according to the present embodiment includes a disparity measuring unit 410, a physical distance calculating unit 420, and a depth controlling unit 430.

The disparity measuring unit 410 divides an input three-dimensional image into a left eye image and a right eye image and measures the disparity between the left eye image and the right eye image. The disparity measuring unit 410 estimates the disparity between the left eye image and the right eye image. The method of estimating the disparity may use block-based movement estimation as used by MPEG encoding. First, the left eye image is divided into N×N uniform blocks. Subsequently, for each block in the left eye image, the most similar block is estimated in the right eye image using a sum of absolute difference (SAD) or a mean of absolute difference (MAD) calculation. The distance between a reference block and its estimated similar block forms a disparity vector, measured in pixels. That is, the disparity between the left eye image and the right eye image at a specific position is represented by the distance in pixels between the same objects in the left eye image and the right eye image at that point.

The disparity measuring unit 410 determines any one of a maximum value d(max), a minimum value d(min), and a mean value d(mean) of the estimated disparities as a reference value and sends it to the physical distance calculating unit 420.

The physical distance calculating unit 420 calculates the physical distance between the left eye image and the right eye image based on the measured disparity and the physical characteristics of the display. The physical distance calculating unit 420 reads the physical size P of one pixel displayed on the screen and multiplies the physical size P of the pixel by the reference value determined by the disparity measuring unit 410, to calculate the physical distance between the objects in the left eye image and the right eye image. The physical size P of the pixel may be stored in a storage unit such as a ROM of the display.

The depth controlling unit 430 controls the calculated physical distance based on a threshold value determined in accordance with the physical characteristics of the display, and controls the depth in accordance with the controlled distance. The depth controlling unit 430 reconstructs the image using an intermediate view reconstruction method, based on the controlled distance, and replaces either the left eye image or the right eye image with the reconstructed image, and outputs the replacement image and the unchanged other eye image. When these are displayed, an image having controlled depth is viewed. Alternatively, the depth control unit 430 horizontally moves the left eye image and the right eye image based on the controlled distance, synthesizes the horizontally moved left eye image and right eye image, and outputs the image having the controlled depth. The depth controlling apparatus 400 may include a display unit (not shown) for displaying the three-dimensional image output from depth controlling unit 430 to embody a display system for outputting the three-dimensional image.

The process of controlling the depth with the depth controlling unit 430 will be described in detail with reference to FIGS. 5 and 6.

Figure 5:
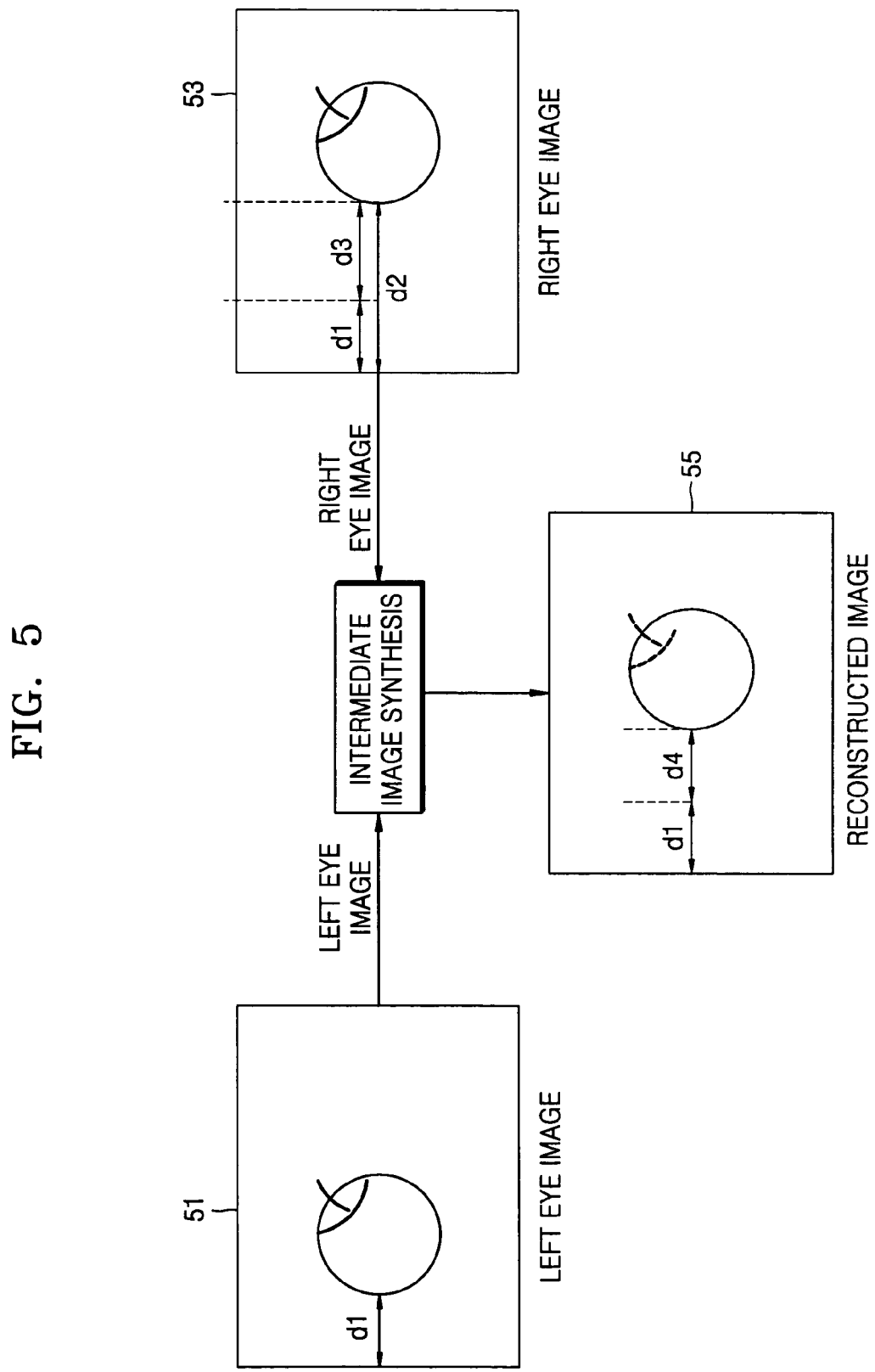
FIG. 5 illustrates a process of controlling the depth using an intermediate view reconstruction method in a depth controlling unit illustrated in FIG. 4.

FIG. 5 illustrates a process of controlling the depth using the intermediate view reconstruction method in the depth controlling unit 430 illustrated in FIG. 4.

The depth controlling unit 430 controls the depth based on the physical distance calculated by the physical distance calculating unit 420. If the physical distance must be controlled, the depth controlling unit 430 performs the following operations.

The depth controlling unit 430 receives the maximum value of the physical distance calculated by the physical distance calculating unit 420 and compares the received maximum value with a maximum threshold value of the physical distance. If the received maximum value is greater than the maximum threshold value, the depth controlling unit 430 controls the maximum value to be less than the maximum threshold value, and controls the physical distance between the objects in the images in proportion to the controlled value. That is, the value obtained by multiplying the maximum value of the disparity between the objects in the images by the physical size of one pixel of the display is controlled to less than the predetermined threshold value and the total disparity of the image is controlled in proportion to the controlled value.

The maximum value of the physical distance, D(max), is obtained by multiplying the maximum value d(max) of the measured disparities by the physical size P of one pixel. The maximum threshold value th(max) is the maximum value of the physical distance between the left eye image 51 and the right eye image 53 in the display as used by a user within a range which does not cause eyestrain or other fatigue, as determined experimentally. The maximum threshold value can be obtained from the depth having the maximum value within a range wherein fatigue is not induced.

Referring to FIG. 5, d1 denotes the distance from the left edge to the object in the left eye image 51, d2 denotes the distance from the left edge to the object in the right eye image 53, and d3 denotes the disparity between the objects in the left eye image 51 and the right eye image 53. In the reconstructed image 55, d4 denotes the disparity which is controlled to prevent user fatigue. That is, if D(max)>th(max), a new image having the disparity d4 is generated using Equation 1, and the existing right eye image 53 is replaced with the new image, thereby reducing user fatigue.

$$d4 \times P = th(\max) \times d3 \times P/D(\max) = th(\max) \times d3 \times P/(d(\max) \times P) \qquad \text{Equation 1}$$

Although the maximum value of the physical distance is less than the maximum threshold value, if the total disparity of the image is large, the user may feel fatigued. In this case, the depth controlling unit 430 receives the mean value of the physical distance calculated by the physical distance calculating unit 420 and compares it with a mean threshold value of the physical distance. Then, if the calculated mean value is greater than the mean threshold value, the depth controlling unit 430 controls the calculated mean value to less than the mean threshold value, and controls the physical distance between the objects in the images in proportion to the controlled mean value.

The mean value of the physical distance, D(mean), is obtained by multiplying the mean value d(mean) of the disparities calculated by the disparity measuring unit 410 by the physical size P of one pixel. The mean threshold value th(mean) is the average of the physical distances between the left eye image 51 and the right eye image 53 in the display as used by the user within the range which does not cause eyestrain or other fatigue, as determined experimentally.

If D(mean)>th(mean), a new image having the disparity d4 is generated using Equation 2 and the existing right eye image 53 is replaced with the new image, thereby reducing the fatigue of the user.

$$d4 \times P = th(\text{mean}) \times d3 \times P/D(\text{mean}) \qquad \text{Equation 2}$$

Up to now, the case of using a display having a larger screen size than the display which can optimally display the three-dimensional image has been described. When using a display having a smaller screen size than the optimal display, the physical depth or the disparity decreases and thus eyestrain is reduced. However, the three-dimensional effect may reduced by the decreasing depth. In this case, the three-dimensional effect must be increased by increasing the total disparity.

Accordingly, the depth controlling unit 430 compares the maximum value of the physical distance calculated by the physical distance calculating unit 420 with a minimum threshold value of the physical distance. If the calculated maximum value is less than the minimum threshold value, the depth controlling unit 430 controls the calculated maximum value to greater than the minimum threshold value, and controls the physical distance between the objects in the images in proportion to the controlled maximum value.

The minimum threshold value th(min) is the minimum value of the physical distance between the left eye image 51 and the right eye image 53 in the display as used by the user, within the range which does not cause eyestrain or other fatigue, as determined experimentally.

If D(max)<th(min), a new image having the disparity d4 is generated using Equation 3 and the existing right eye image 53 is replaced with the new image, thereby increasing three dimensional effect.

$$d4 \times P = th(\min) \times d3 \times P/D(\max) \qquad \text{Equation 3}$$

The image having the physical distance of d4×P is reconstructed by the intermediate view reconstruction method, the right eye image 53 is replaced with the reconstructed intermediate image 55, and the left eye image 51 and the intermediate image 55 overlap each other and are output. When the proper disparity d4 or the proper physical distance d4×P is determined in order to control the depth, any one or at least two of Equations 1, 2, and 3 may be used in accordance with the characteristics of the input three-dimensional image.

In FIG. 5, the right eye image 53 was replaced with the reconstructed image using a method of determining proper disparity based on the distance from the left edge to the object. However, the proper disparity may be calculated based on the distance from the right edge to the object. In this case, the left eye image 51 is replaced with the reconstructed image using the intermediate view reconstruction method. That is, the image 53 of FIG. 5 and the reconstructed image reconstructed by the intermediate view reconstruction method overlap each other and are output.

Figure 6:
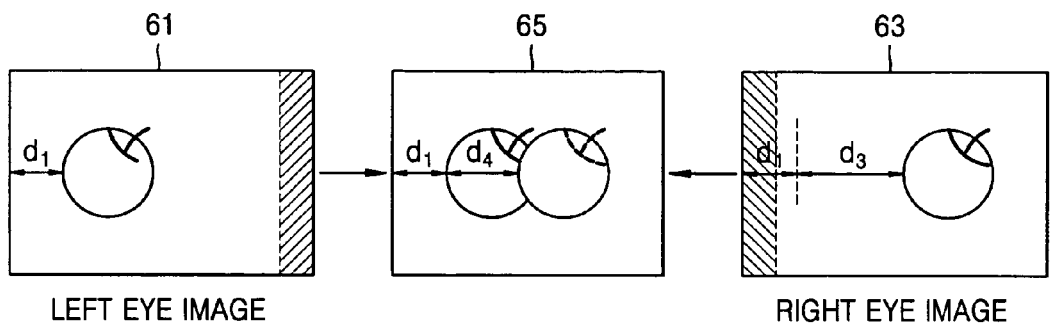
FIG. 6 illustrates a process of horizontally moving a left eye image and a right eye image to control image depth in the depth controlling unit illustrated in FIG. 4.

FIG. 6 illustrates a process of horizontally moving the left eye image 51 and the right eye image 53 to control the depth in the depth controlling unit 430 illustrated in FIG. 4.

Left eye image 61 is the image obtained by horizontally moving the left eye image 51 of FIG. 5 to the right side, and a hatched region indicates a portion which is lost in the process. Right eye image 63 is the image obtained by horizontally moving the right eye image 53 of FIG. 5 to the left side, and a hatched region indicates a portion which is lost in the process. An image 65 is obtained by synthesizing the horizontally moved left eye image 61 and right eye image 63. Accordingly, the left eye image 51 and the right eye image 53 must be moved horizontally such that the disparity between the left and right eye images is controlled to the disparity d4 as determined above.

Referring to FIG. 6, in order to output the image having the disparity d4, the left eye image 51 is horizontally moved by d3-d4/2 to the right side and the right eye image 53 is horizontally moved by d3-d4/2 to the left side. When the left eye image 61 and the right eye image 63 are synthesized, the three-dimensional image 65 having the disparity d4 can be generated. Similar to the method described with reference to FIG. 5, when the proper disparity d4 or the proper physical distance d4×P is determined in order to control the depth, any one or at least two of Equations 1, 2, and 3 may be used in accordance with the characteristics of the input three-dimensional image.

Figure 7:
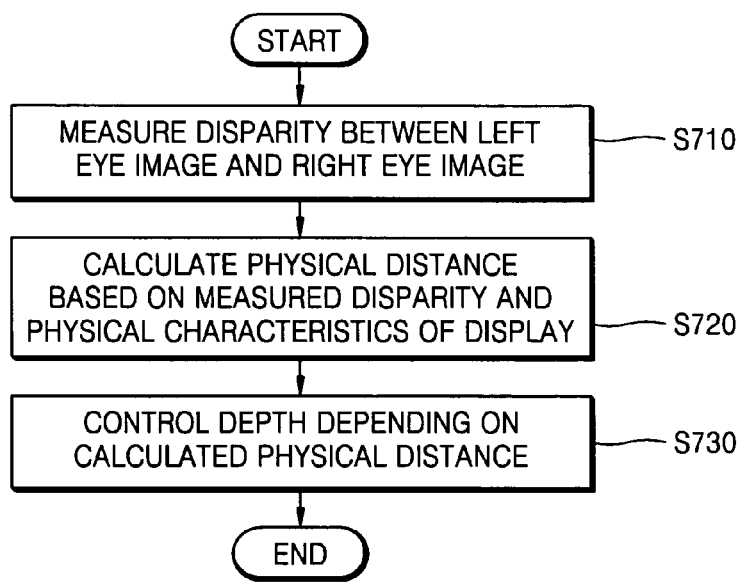
FIG. 7 is a flowchart illustrating a method for adaptively controlling the depth of a three-dimensional image according to an embodiment of the present invention.

FIG. 7 is a flowchart illustrating a method of adaptively controlling the depth of a three-dimensional image according to an embodiment of the present invention.

In order to control the depth of the three-dimensional image, the disparity between the left eye image and the right eye image is measured (S710).

Based on the measured disparity and the physical characteristics of the display, the physical distance between the left eye image and the right eye image is calculated (S720).

The depth is controlled in accordance with the calculated physical distance (S730). The image having the controlled depth is displayed on the display to provide a user with an image having an adaptively controlled three-dimensional effect.

The invention can also be embodied as computer readable code on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, optical data storage devices, and carrier waves (such as data transmission through the internet). The computer readable recording medium can also be distributed over network coupled computer systems so that the computer readable code is stored and executed in a distributed fashion. Also, functional programs, code, and code segments for accomplishing the present invention can be easily constructed by programmers skilled in the art to which the present invention pertains.

According to the present invention, it is possible to provide an apparatus and method for adaptively controlling disparity to control the image depth when a user uses a stereoscopic three-dimensional display having a different screen size than a display used in a manufacturing environment.

While the present invention has been particularly shown and described with reference to exemplary embodiments thereof, it will be understood by those of ordinary skill in the art that various changes in form and detail may be made therein without departing from the spirit and scope of the present invention as defined by the following claims.

What is claimed is:

1. An apparatus for controlling the depth of a three-dimensional image, comprising:
    a disparity measuring unit which measures the disparity between a left eye image and a right eye image;
    a physical distance calculating unit which calculates the physical distance between the left eye image and the right eye image based on the measured disparity and the physical characteristics of a display; and
    a depth controlling unit which alters the three-dimensional image to control the depth depending on the calculated physical distance;
    wherein the physical characteristics of the display include the physical size of one pixel in the display, and
    the physical distance calculating unit reads the physical size of one pixel which has been previously stored and multiplies a reference value by the physical size of that pixel to calculate the physical distance of the disparity.

2. The apparatus according to claim 1, wherein the disparity measuring unit estimates the disparity between the left eye image and the right eye image and determines any one of a maximum value, a minimum value, and a mean value of the disparity as the reference value.

3. The apparatus according to claim 1, wherein the depth controlling unit controls the physical distance based on a threshold value determined depending on the physical characteristics of the display.

4. The apparatus according to claim 3, wherein the depth controlling unit compares a maximum value of the calculated physical distance with a maximum threshold value of the physical distance, controls the maximum value to less than the maximum threshold value if the calculated maximum value is greater than the maximum threshold value, and controls the physical distance between objects in the images in proportion to the controlled maximum value.

5. The apparatus according to claim 3, wherein the depth controlling unit compares a mean value of the calculated physical distance with a mean threshold value of the physical distance, controls the mean value to less than the mean threshold value if the calculated mean value is greater than the mean threshold value, and controls the physical distance between objects in the images in proportion to the controlled mean value.

6. The apparatus according to claim 3, wherein the depth controlling unit compares a maximum value of the calculated physical distance with a minimum threshold value of the physical distance, controls the maximum value to greater than the minimum threshold value if the calculated maximum value is less than the minimum threshold value, and controls the physical distance between objects in the images in proportion to the controlled maximum value.

7. The apparatus according to claim 3, wherein the depth controlling unit reconstructs an intermediate image using an intermediate view reconstruction method based on the controlled physical distance, and replaces at least one of the left eye image and the right eye image with the reconstructed intermediate image to control the depth.

8. The apparatus according to claim 3, wherein the depth controlling unit horizontally moves the left eye image and the right eye image based on the controlled physical distance and synthesizes the horizontally moved left eye image and right eye image to control the depth.

9. The apparatus according to claim 1, further comprising a display unit which displays the image having the controlled depth, output from the depth controlling unit.

10. A method for controlling the depth of a three-dimensional image, comprising:
    measuring the disparity between a left eye image and a right eye image;
    calculating the physical distance between the left eye image and the right eye image based on the measured disparity and the physical characteristics of a display; and
    altering the three-dimensional image to control the depth depending on the calculated physical distance, wherein the controlling of the depth is carried out by a computer system with a processor and a memory;
    wherein the physical characteristics of the display include the physical size of one pixel in the display, and
    the calculating of the physical distance includes reading the physical size of one pixel which is previously stored and multiplying a reference value by the physical size of that pixel to calculate the physical distance of the disparity.

11. The method according to claim 10, wherein the measuring of the disparity includes estimating the disparity between the left eye image and the right eye image and determining any one of a maximum value, a minimum value, and a mean value of the disparity as the reference value.

12. The method according to claim 10, wherein the controlling of the depth includes controlling the physical distance based on a threshold value determined depending on the physical characteristics of the display.

13. The method according to claim 12, wherein the controlling of the depth includes comparing a maximum value of the calculated physical distance with a maximum threshold value of the physical distance, controlling the maximum value to less than the maximum threshold value if the calculated maximum value is greater than the maximum threshold value, and controlling the physical distance between objects in the images in , proportion to the controlled maximum value.

14. The method according to claim 12, wherein the controlling of the depth includes comparing a mean value of the calculated physical distance with a mean threshold value of the physical distance, controlling the mean value to less than the mean threshold value if the calculated mean value is greater than the mean threshold value, and controlling the physical distance between objects in the images in proportion to the controlled mean value.

15. The method according to claim 12, wherein the controlling of the depth includes comparing a maximum value of the calculated physical distance with a minimum threshold value of the physical distance, controlling the maximum value to greater than the minimum threshold value if the calculated maximum value is less than the minimum threshold value, and controlling the physical distance between objects in the images in proportion to the controlled maximum value.

16. The method according to claim 12, wherein the controlling of the depth includes reconstructing an intermediate image using an intermediate view reconstruction method based on the controlled physical distance and replacing at least one of the left eye image and the right eye image with the reconstructed intermediate image to control the depth.

17. The method according to claim 12, wherein the controlling of the depth includes horizontally moving the left eye image and the right eye image based on the controlled physical distance and synthesizing the horizontally moved left eye image and right eye image to control the depth.

18. The method according to claim 10, further comprising displaying the image having the controlled depth.

19. A computer-readable medium having embodied thereon a computer program for the method of claim 10.

* * * * *